UNITED STATES PATENT OFFICE.

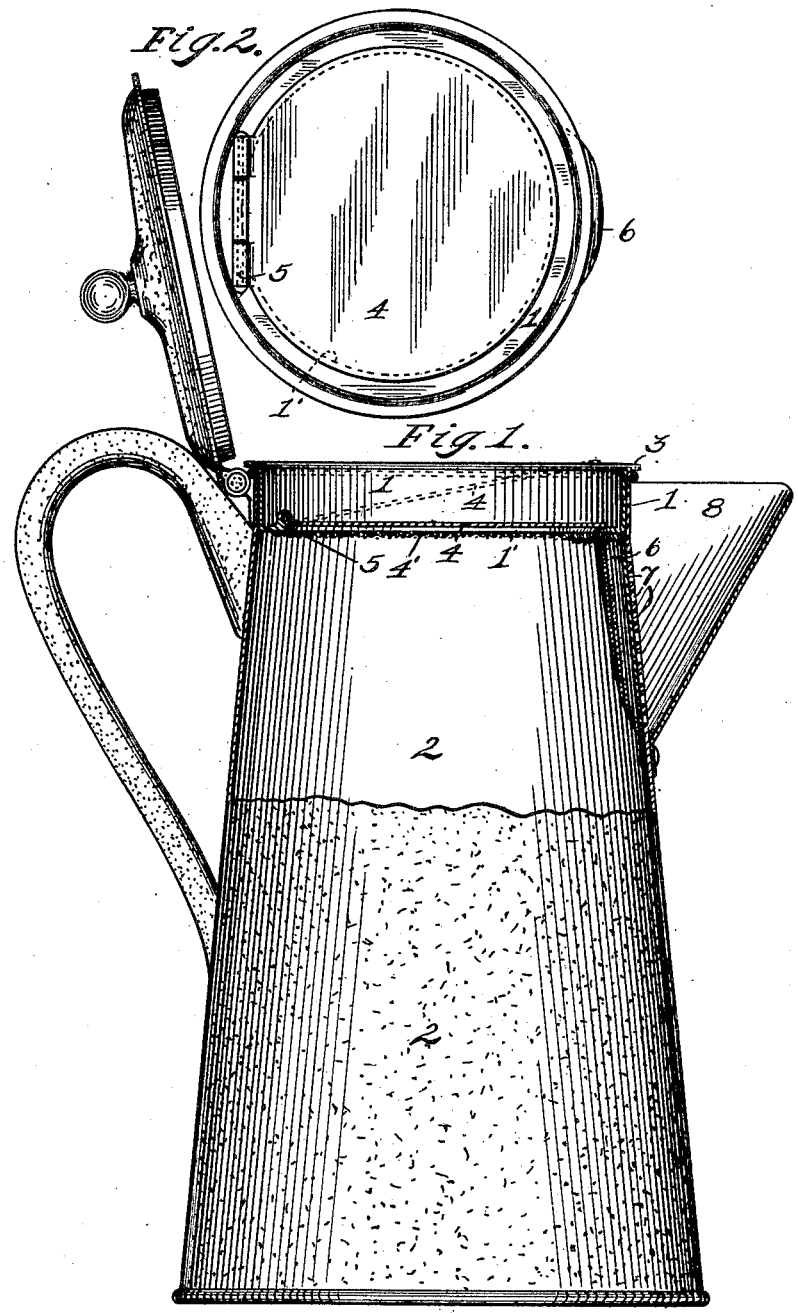

JOSEPH BRYERS, OF CHICAGO, ILLINOIS.

COOKING UTENSIL.

971,727. Specification of Letters Patent. Patented Oct. 4, 1910.

Application filed September 30, 1909. Serial No. 520,394.

*To all whom it may concern:*

Be it known that I, JOSEPH BRYERS, a citizen of the United States, residing at Chicago, county of Cook, and State of Illinois, have invented certain new and useful Improvements in Cooking Utensils, of which the following is a specification.

My invention relates to improvements in cooking utensils and has for its object the production of a utensil such as a coffee pot or the like provided with means for preventing the same from boiling over.

The invention consists in the combination and arrangement of parts hereinafter described and claimed.

My invention will be best understood by reference to the accompanying drawings forming a part of this specification, and in which, Figure 1 is a side elevation partially in section of a coffee pot equipped with means for preventing its boiling over which embody my invention, and Fig. 2, a top plan view of said means.

In the preferred form of construction as illustrated in the drawings a shallow cup 1 is removably inserted into the mouth or top of coffee pot 2. The cup 1 is preferably provided with a flange 3 at its upper edge adapted to rest upon the upper edge of the coffee pot. The bottom of cup 1 is provided with a large opening 1' above which is placed an upwardly swinging plate 4 hinged to said cup at 5. Below opening 1' is placed a wire screen 4' which prevents the passage of coffee grounds into cup 1. At one side cup 1 is provided with a yieldable shield 6 arranged to rest over the inside of the ordinary strainer 7 of the pot thus shutting off access to spout 8.

In operation the plate 4 is free to rise to permit the escape of steam and the upwardly rising bubbles striking against the bottom of cup 1 and said plate are burst thus preventing boiling over.

While I have illustrated and described the preferred form of construction for carrying my invention into effect, this is capable of modification or variation without departing from the spirit of my invention. I, therefore, do not wish to be limited to the exact details of construction set forth, but desire to avail myself of such variations and modifications as come within the scope of the appended claims.

Having described my invention what I claim as new and desire to secure by Letters Patent is:

1. A device of the class described, comprising a partition arranged across the mouth of a pot below the normal top thereof and provided with an upwardly swinging plate occupying the greater portion of the area of the pot and adapted to permit the escape of steam; and a wire screen secured across the opening in said partition, substantially as described.

2. A device of the class described, comprising a cup adapted to be inserted in the mouth of a pot and provided with a bottom having an upwardly swinging plate occupying the greater portion of the area of the pot and adapted to permit the escape of steam therethrough; and a wire screen secured across the opening in the bottom of said cup, substantially as described.

3. A device of the class described, comprising a cup adapted to be inserted into the mouth of a pot and provided with a bottom having an upwardly swinging plate occupying the greater portion of the area of the pot and adapted to permit the passage of steam therethrough, said cup also carrying a shield adapted to cover the ordinary strainer of a pot, substantially as described.

4. A device of the class described, comprising a cup adapted to be inserted in the mouth of a pot and provided with a bottom having an upwardly swinging plate adapted to permit the passage of steam therethrough and a wire screen secured across the bottom of said cup, substantially as described.

In testimony whereof I have signed my name to this specification in the presence of two subscribing witnesses.

JOSEPH BRYERS.

Witnesses:
   JOSHUA R. H. POTTS,
   W. C. SMITH.